(12) United States Patent
Chippendale et al.

(10) Patent No.: US 12,030,240 B2
(45) Date of Patent: Jul. 9, 2024

(54) FIXTURE SYSTEM FOR USE IN ADDITIVE MANUFACTURING

(71) Applicant: BAE Systems plc, London (GB)

(72) Inventors: John Chippendale, Blackburn (GB); Jack Richard Sharples, Blackburn (GB)

(73) Assignee: BAE Systems plc, London (GB)

( * ) Notice: Subject to any disclaimer, the term of this patent is extended or adjusted under 35 U.S.C. 154(b) by 607 days.

(21) Appl. No.: 17/293,990

(22) PCT Filed: Dec. 10, 2019

(86) PCT No.: PCT/GB2019/053485
§ 371 (c)(1),
(2) Date: May 14, 2021

(87) PCT Pub. No.: WO2020/120946
PCT Pub. Date: Jun. 18, 2020

(65) Prior Publication Data
US 2022/0008998 A1    Jan. 13, 2022

(30) Foreign Application Priority Data

Dec. 12, 2018 (EP) ..................................... 18212031
Dec. 12, 2018 (GB) ..................................... 1820234

(51) Int. Cl.
*B22F 12/30* (2021.01)
*B29C 64/118* (2017.01)
(Continued)

(52) U.S. Cl.
CPC ............ *B29C 64/118* (2017.08); *B22F 12/30* (2021.01); *B33Y 30/00* (2014.12); *B22F 10/25* (2021.01);
(Continued)

(58) Field of Classification Search
CPC ... B29C 64/118; B29C 64/153; B29C 64/245; B22F 10/40; B22F 12/30; B22F 10/47; B33Y 10/00; B33Y 30/00
See application file for complete search history.

(56) References Cited

U.S. PATENT DOCUMENTS

2017/0313049 A1    11/2017  Colchester
2022/0008998 A1*    1/2022  Chippendale ......... B29C 64/153

FOREIGN PATENT DOCUMENTS

CN           106079431 A     11/2016
CN           106956002 A      7/2017
(Continued)

OTHER PUBLICATIONS

International Search Report and Written Opinion for PCT Appl. No. PCT/GB2019/053485, mail date Jan. 13, 2020, 13 Pages.
(Continued)

*Primary Examiner* — Jessee R Roe
*Assistant Examiner* — Michael Aboagye
(74) *Attorney, Agent, or Firm* — Maine Cernota & Curran

(57) ABSTRACT

A system comprising: a substrate; a fixture for receiving the substrate; and four fasteners. The substrate has two axes, and a build surface. The substrate comprises four slots through the substrate from the build surface to an opposite surface. Lengths of first and second slots are aligned along a first axis. The first and second slots are at opposite sides of the build surface to each other. Lengths of the third and fourth slots are aligned along the second axis. The third and fourth slots are at opposite sides of the build surface to each other. The fasteners fit through respective slots. The lengths of the slots are greater than diameters of portions of the fasteners that are positioned through the slots.

13 Claims, 5 Drawing Sheets

(51) Int. Cl.
  *B33Y 30/00*   (2015.01)
  *B22F 10/25*   (2021.01)
  *B22F 10/28*   (2021.01)
  *B22F 10/47*   (2021.01)
  *B22F 12/20*   (2021.01)
  *B22F 12/44*   (2021.01)

(52) U.S. Cl.
  CPC ............... *B22F 10/28* (2021.01); *B22F 10/47* (2021.01); *B22F 12/20* (2021.01); *B22F 12/44* (2021.01)

(56) References Cited

FOREIGN PATENT DOCUMENTS

| | | |
|---|---|---|
| CN | 107900338 A | 4/2018 |
| CN | 207388310 U | 5/2018 |
| WO | 2005025781 A1 | 3/2005 |
| WO | 2014072699 A1 | 5/2014 |

OTHER PUBLICATIONS

Search Report for European Patent Appl. No. 18212031.1, mail date Jun. 19, 2019, 9 Pages.
Search Report for Great Britain Patent Appl. No. 1820234.1, mail date Jun. 21, 2019, 3 Pages.
Search Report for Great Britain Patent Appl. No. 1918092.6, mail date Jun. 30, 2020, 4 Pages.
International Preliminary Report on Patentability for PCT Application No. PCT/GB2019/053485 mail date Jul. 7, 2021, 8 pages.

* cited by examiner

FIXTURE SYSTEM FOR USE IN ADDITIVE MANUFACTURING

RELATED APPLICATIONS

This application is a national phase application filed under 35 USC § 371 of PCT Application No. PCT/GB2019/053485 with an International filing date of Dec. 10, 2019, which claims priority of GB Patent Application 1820234.1 filed Dec. 12, 2018 and EP Patent Application 18212031.1 filed Dec. 12, 2018. Each of these applications is herein incorporated by reference in its entirety for all purposes.

STATEMENT OF GOVERNMENT INTEREST

The project leading to this application has received funding from the European Union's Horizon 2020 research and innovation programme under grant agreement No 723600.

FIELD OF THE INVENTION

The present invention relates to substrates, i.e., workpieces for use in Additive Manufacturing (AM) processes and fixtures for retaining the same.

BACKGROUND

Additive Manufacturing (AM) (also known as Additive Layer Manufacture (ALM), 3D printing, etc.) is a process that may be used to produce functional, complex objects, layer by layer, without moulds or dies. Example AM processes include, but are not limited to, Laser Blown Powder, Laser Powder Bed, and Wire and Arc technologies. Typically, such processes include providing material (e.g. metal or plastic) in the form of a powder or a wire, and, using a powerful heat source such as a laser beam, electron beam or an electric, or plasma welding arc, melting an amount of that material and depositing the melted material on a substrate or work piece. Subsequent layers are then built up upon each preceding layer to produce a sintered article. After the article has been completed, it may be removed from the substrate, or the substrate may form part of the article.

The thermal energy involved in sintering the powder or wire tends to result in residual stresses in the article which tend to cause the article to deform, e.g. curl up. This may result in build failure. The fusing of the article to the substrate during the AM process tends to constrain the article against these thermal residual stresses. However, substrate distortion may occur. This may negatively affect the quality of the articles produced.

To reduce substrate distortion, some AM processes make use of either a heated sintering chamber or a heated substrate. This may reduce the level of differential shrinkage between the article and the substrate. This can reduce the level of thermal residual stress. However, such AM processes tend to have greater system complexity, and cooling rates of the sintered material are changed.

SUMMARY OF THE INVENTION

In a first aspect, the present invention provides a system comprising a substrate, a fixture configured to receive the substrate, and four fasteners. The substrate has a first axis and a second axis, the second axis being perpendicular to the first axis. The substrate comprises a build surface configured to have formed thereon an article by an additive manufacturing (AM) process. The build surface is substantially parallel to a plane defined by the first and second axes. The substrate comprises a first slot, a second slot, a third slot, and a fourth slot. Each slot has a respective length and width, the width of a slot being perpendicular to the length of that slot, the width of a slot being less than the length of that slot. Each slot is a slot through the substrate from the build surface to a surface of the substrate opposite to the build surface. The length of the first slot is aligned along the first axis. The length of the second slot is aligned along the first axis. The first and second slots are positioned at or proximate to opposite edges of the build surface to each other. The length of the third slot is aligned along the second axis. The length of the fourth slot is aligned along the second axis. The third and fourth slots are positioned at or proximate to opposite edges of the build surface to each other. The fasteners are configured for, when the substrate is received by the fixture, attaching the substrate to the fixture by locating each fastener through a respective slot. For each slot, the length of that slot is greater than a diameter of a portion of the fastener that is positioned through that slot when the substrate is attached to the fixture.

For each slot, the width of that slot may be substantially equal to the diameter of the portion of the fastener that is positioned through that slot when the substrate is attached to the fixture.

The substrate may comprise one or more through holes located at or proximate to an edge of the build surface. The one or more through holes may be through the substrate from the build surface to the surface of the substrate opposite to the build surface. The one or more through holes may be spaced apart from the first and second axes. The system may further comprise one or more further fasteners. Each of the one or more further fasteners may be configured for, when the substrate is received by the fixture, attaching the substrate to the fixture by locating that further fastener through a respective through hole of the substrate. For each through hole of the substrate, the diameter of that through hole may be substantially equal to the diameter of the portion of the further fastener that is positioned through that through hole when the substrate is attached to the fixture.

The substrate may further comprise a plurality of datum holes. Each datum hole may be a hole through the substrate from the build surface to the surface of the substrate opposite to the build surface. Each datum hole may be located along one of the axes. Each datum hole may be located proximate to a respective slot.

The fixture may comprise an outer wall and a flange extending inwardly and perpendicularly from the outer wall. The fixture may be configured to receive the substrate by positioning the substrate against the flange. When the fixture receives the substrate by positioning the substrate against the flange, the substrate may be spaced apart from the outer wall. The flange may comprise a plurality of through holes arranged such that, when the fixture receives the substrate by positioning the substrate against the flange, each of the through holes of the flange is aligned with a respective slot. The fasteners may be configured for, when the substrate is received by the fixture, attaching the substrate to the fixture by locating each fastener through a respective slot and a through hole of the flange aligned therewith. For each through hole of the flange, the diameter of that through hole may be substantially equal to the diameter of the portion of the fastener that is positioned through that through hole when the substrate is attached to the fixture.

Each fastener may comprise a bolt comprising a bolt head and a threaded shaft extending from the bolt head, a bushing comprising a sleeve for positioning around the shaft and a bushing flange extending radially outwards from the sleeve, and a nut for threadedly engaging with the shaft.

The substrate may be attached to the fixture by the fasteners. For each fastener, the shaft may be positioned through a slot of the substrate, the sleeve of the bushing, the fixture, and the nut such that the substrate, the bushing, and the fixture are clamped between the bolt head and the nut. The bushing may be located through the slot of the substrate such that the sleeve of the bushing is located within the slot and the bushing flange faces the build surface of the substrate. The bushing may be configured such that the bushing flange and the build surface are spaced apart.

The substrate may be attached to the fixture by the fasteners. The fasteners may apply a force of less than or equal to 60 Nm to the substrate. The substrate may be a metal substrate. A size of the substrate along at least one of the axes may be at least 5 m.

The substrate may form part of the final article (i.e. the final built item). As such the substrate may be configured to have formed thereon an article by an additive manufacturing process and may be configured to be integral to the finished additively manufactured article. The substrate may also be configured to be consumable.

DETAILED DESCRIPTION

It will be appreciated that relative terms such as top and bottom, upper and lower, and so on, are used merely for ease of reference to the Figures, and these terms are not limiting as such, and any two differing directions or positions and so on may be implemented.

Figure 1:
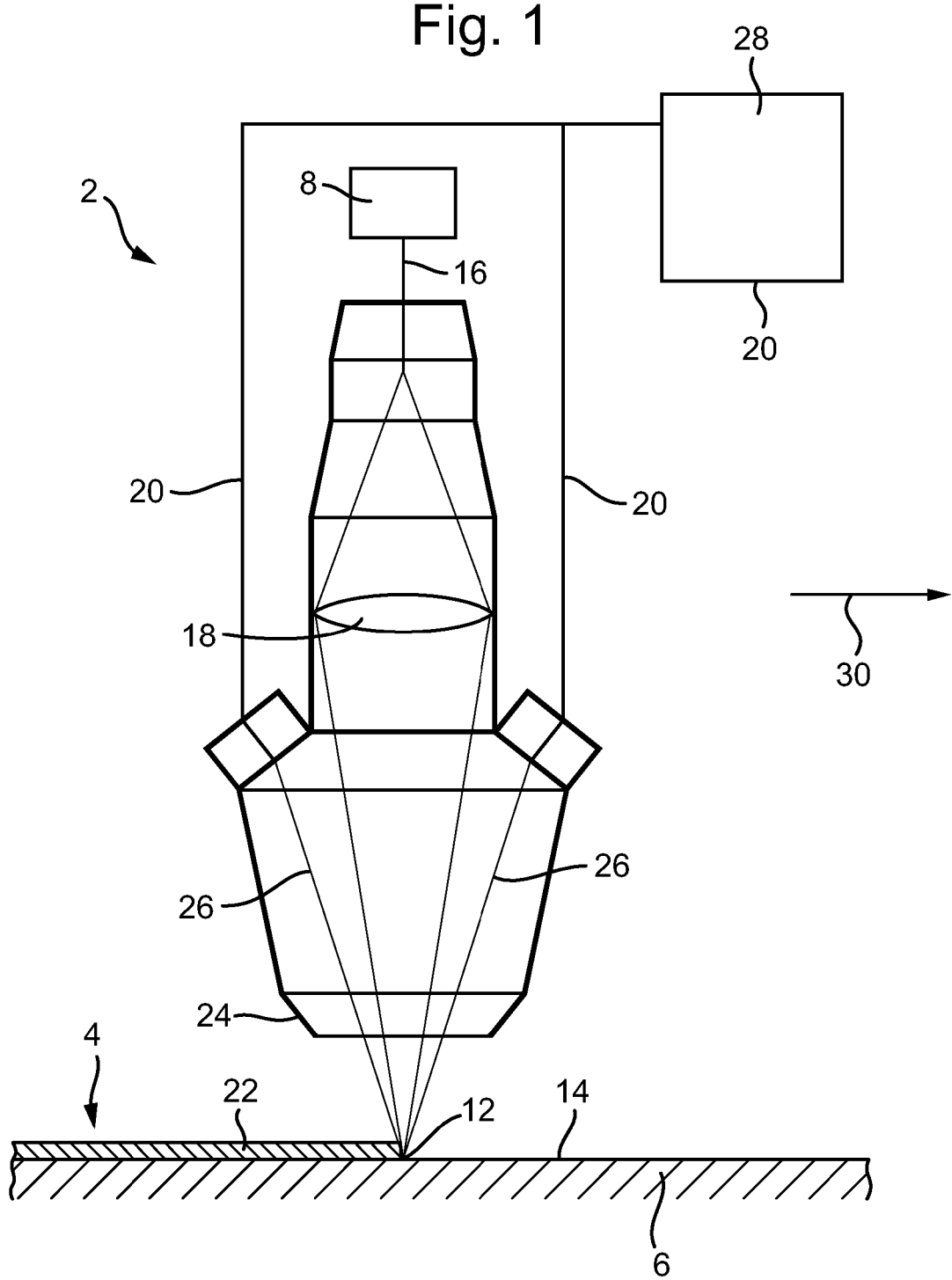
FIG. 1 is a schematic illustration (not to scale) of an example additive manufacturing apparatus forming an article on a substrate.

FIG. 1 is a schematic illustration (not to scale) of an example additive manufacturing (AM) apparatus 2 that may be used to produce an article 4 on a substrate 6 by performing an AM process. The substrate 6 may become part of the finished article 4. The substrate 6 may be considered replaceable (i.e. may not be reused for subsequent builds) and may be considered consumable. A fixture system for holding the substrate 6 during the AM process is described in more detail later below with reference to FIGS. 2 to 10.

In this example, the AM apparatus 2 is a Directed Energy Deposition (DED) apparatus configured to perform a DED process to produce the article 4. Examples of DED processes include, but are not limited to, Direct Metal Deposition (DMD), Direct Laser Melting (DLM), Direct Laser Sintering (DLS), Laser Engineering Net Shape (LENS), Wire Additive Manufacture Material (WAMMAT), Selective Laser Melting (SLA), and Supersonic Particle Deposition (SSPD). It will be appreciated by those skilled in the art that other AM apparatuses may be implemented to build the article 4 on the substrate 6.

The AM apparatus 2 comprises a heat source in the form of a high-powered laser 8, and a source of metal material in the form of a powder delivery system 20. In some embodiments, the AM apparatus 2 further comprises cooling means in the form of a forced cooling gas nozzle (not shown in the Figures) e.g. using air or a cryogenic spray jet.

The laser 8 may be any appropriate type of laser that may operate at any appropriate wavelength and have any appropriate continuous wave power output.

In operation, the laser 8 is focused upon a focal point 12 on an upper surface 14 of the article 4 (or, initially, the substrate 6) whereby to melt the surface 14 to form a weld pool. The laser 8 is controlled by a computer (not shown in the Figures) to deliver a laser beam via an optical fibre 16 to conventional focusing optics 18 which focus the laser beam to the focal point 12 on the upper surface 14 of the item being produced.

In operation, the powder delivery system 20 delivers metallic powder to the vicinity of the laser focal point 12. Thus, the metallic powder is fully melted as it is deposited on the surface 14 to form a layer or bead 22. In operation, many beads 22 are laid down beside one another and built on top of each other to form the article 4.

The powder delivery system 20 delivers metallic powder through a deposition nozzle 24, along a plurality of delivery lines 26 which may be disposed symmetrically around the deposition nozzle 24. The powder delivery system 20 comprises one or more powder reservoirs 28 containing powder from which the article 4 is to be made.

In this embodiment, the AM apparatus 2 is moveable under the control of a computer in the X-Y plane that is parallel to the surface 14 (e.g. as indicated by an arrow 30), and vertically in the Z direction orthogonal to the surface 14. Thus, the laser focal point 12 may be directed to any point in a working envelope in the X-Y plane and vertically so as to accommodate both work pieces of different height and also regions of different height within work pieces. In other words, in this embodiment, the AM apparatus 2 is a 3-axis AM machine. In other embodiments, the AM apparatus 2 is a different type of AM machine, e.g. a 5-axis AM machine.

Figure 2:
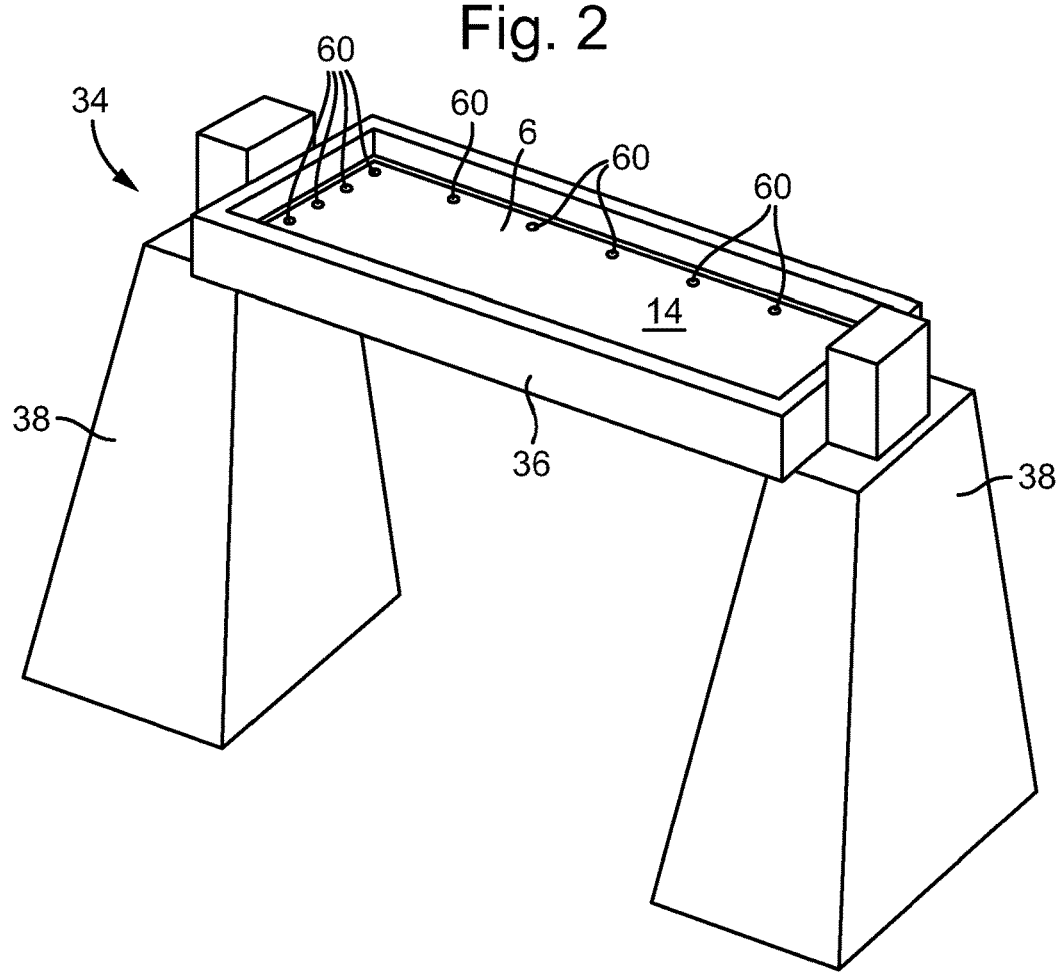
FIG. 2 is a schematic illustration (not to scale) showing a perspective view of a fixture holding the substrate.

FIG. 2 is a schematic illustration (not to scale) showing a perspective view of a fixture 34 holding the substrate 6. Reference numeral 14 is used to indicate the upper surface of the substrate 6.

The fixture 34 comprises a rigid frame 36 and a plurality of support members or "legs" 38.

The frame 36 is configured to hold the substrate 6 during the AM process. The frame 36 will be described in more detail later below with reference to FIG. 3.

In this embodiment, the substrate 6 is cuboid in shape. Thus, the upper surface 14 of the substrate 6 upon which the article 4 is built is rectangular. The substrate 6 will be described in more detail later below with reference to FIGS. 4 to 9.

The substrate 6 is attached to the frame 36 by means of a plurality of fasteners 60 that pass through the substrate 6 and the frame 36. The fasteners 60 and the coupling of the substrate 6 to the frame 36 are described in more detail later below with reference to FIGS. 5 to 10.

The support members 38 are attached to the frame 36. The support members 38 securely hold the frame 36 vertically above a ground or floor surface. In some embodiments, the support members 38 are configured such that the length of the support members may be adjusted, for example to alter the height above the ground at which the frame is positioned, or the ensure that the frame 36 and/or substrate 6 are substantially horizontal, or in some other desired orientation.

Figure 3:
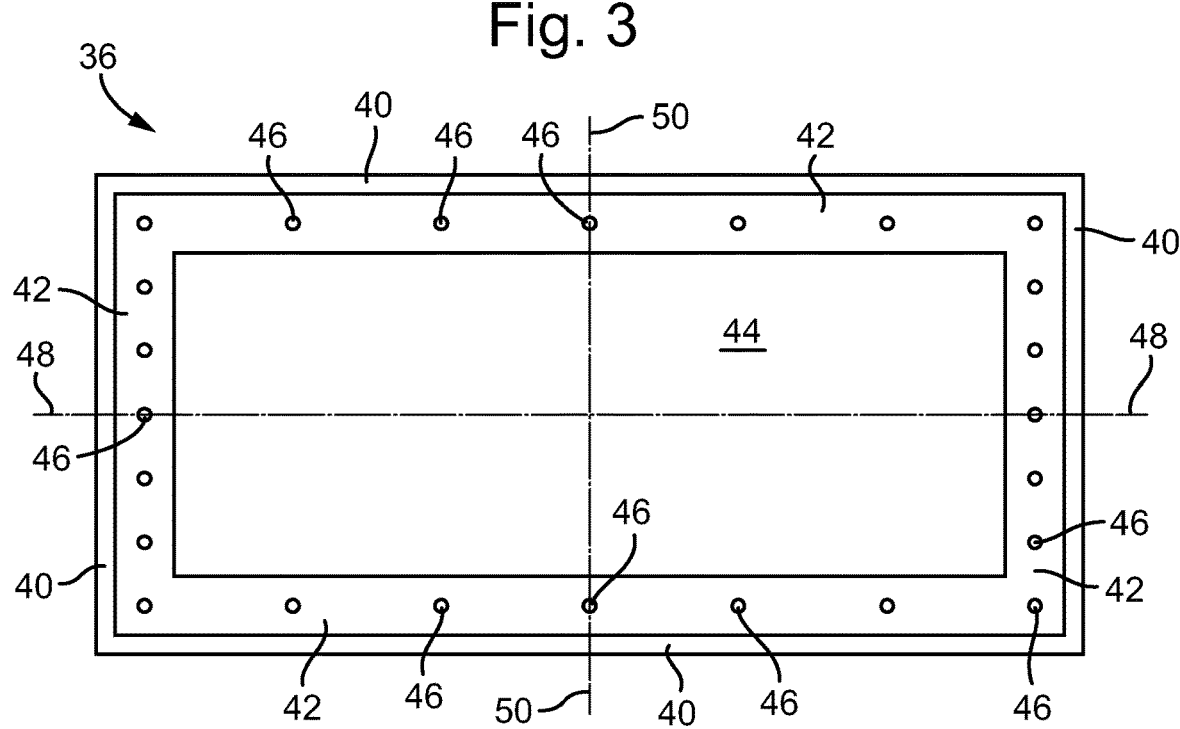
FIG. 3 is a schematic illustration (not to scale) showing a top-down view of a frame of the fixture.

FIG. 3 is a schematic illustration (not to scale) showing a top-down view of the frame 36 of the fixture 34.

In this embodiment, the frame 36 is a rectangular frame. The frame 36 comprises a plurality (e.g. four) elongate steel beams that are attached (e.g. welded) together to form the substantially rectangular frame.

In this embodiment, the frame 36 comprises an outer wall 40 that defines a perimeter of the frame 36, and a flange 42 (or ledge) extending inwardly from the outer wall 40. The flange 42 extends substantially perpendicularly from the outer wall 40. The outer wall 40 may be vertical and the flange 42 may be horizontal. The flange 42 defines or circumscribes an opening 44 through the frame 36. In use, the substrate 6 is placed on the upper surface of the flange 42. Thus, the flange 42 provides a seat for receiving the substrate 6.

Advantageously, the opening 44 allows for an AM process to be performed on either or both sides of the substrate 6. For example, the frame 36 can be turned over (e.g. after the upper surface 14 of the substrate 6 has been built upon) thereby facilitating access to the lower surface of the substrate 6, which can be built upon by the AM apparatus 2 implementing the AM process.

The flange 42 comprises a plurality of first through holes 46. The first through holes 46 pass through the flange 42 from the upper surface of the flange 42 to a lower surface of the flange 42 opposite to the upper surface of the flange 42. In this embodiment, the first through holes 46 are substantially identical to one another. Each of the first through holes 46 is configured to receive a respective fastener. As described in more detail later below, the substrate 6 is coupled to the flange 42 by positioning a respective fastener through each of the first through holes 46 and through the substrate 6. The diameters of the first through holes 46 are substantially equal to the diameters of the portions of the fasteners to be located within the first through holes 46.

In this embodiment, the plurality of first through holes 46 includes through holes positioned along a longitudinal axis 48 of the frame 36. Also, the plurality of first through holes 46 includes through holes positioned along a transverse axis 50 of the frame 36.

Figure 4:
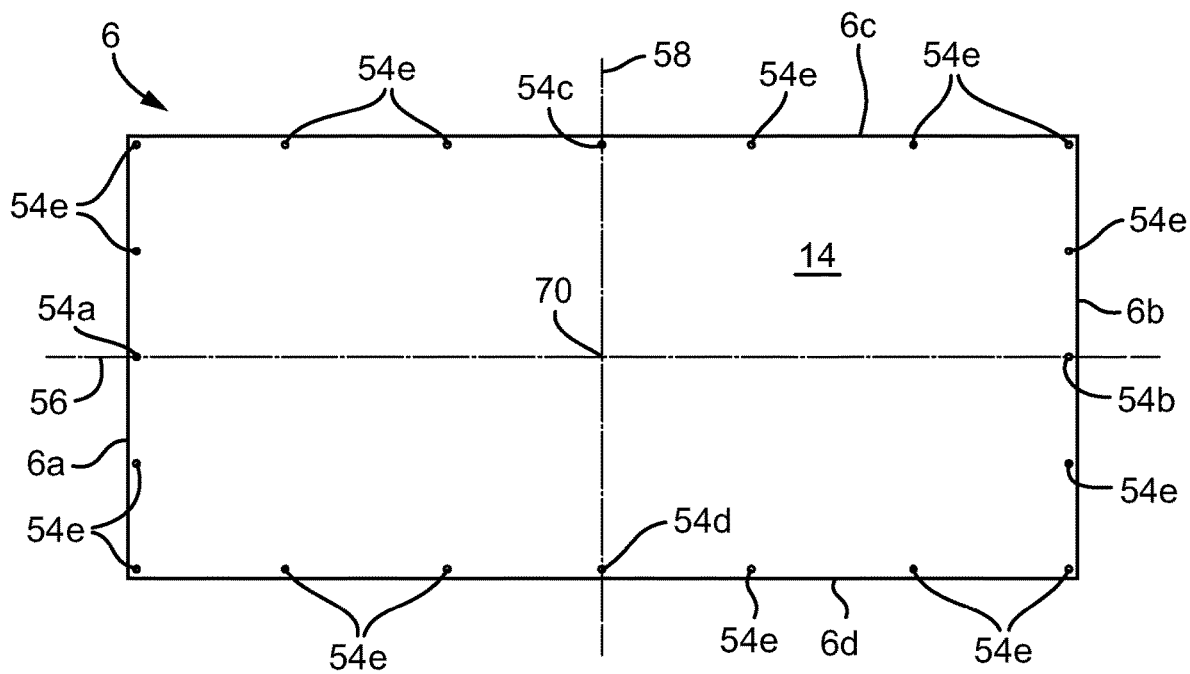
FIG. 4 is a schematic illustration (not to scale) showing a top-down view of the substrate.

FIG. 4 is a schematic illustration (not to scale) showing a top-down view of the substrate 6. Thus, FIG. 4 shows the upper surface 14 of the substrate 6 on which the article 4 is to be built.

The substrate 6 is a large, thick piece of metal such as steel, aluminium, or titanium. In this embodiment, the length of the substrate 6 (i.e. the size of the substrate 6 along its longitudinal axis 56) is at least 5 m, for example about 6 m. Also, the width of the substrate 6 (i.e. the size of the substrate 6 along its transverse axis 58) is at least 0.5 m, or more preferably at least 1 m, for example between about 0.5 m and 1 m. Also, the depth of the substrate 6 (i.e. the size of the substrate 6 between the upper surface 14 and the lower surface of the substrate 6) is at least 10 cm, or more preferably at least 20 cm, for example between about 10 cm and 20 cm. In use, some deformation of the substrate 6 may occur, as described in more detail later below.

The substrate 6 comprises a plurality of second through holes 54a-e.

In this embodiment, the plurality of second through holes 54a-e includes through holes (namely a first substrate through hole 54a and a second substrate through hole 54b) positioned along the longitudinal axis 56 of the frame 36. The first substrate through hole 54a is positioned proximate to a first end 6a of the substrate 6 and is positioned along the longitudinal axis 56 of the frame 36. The second substrate through hole 54b is positioned proximate to a second end 6b of the substrate 6 (the second end 6b being opposite to the first end 6a) and is positioned along the longitudinal axis 56 of the frame 36. The plurality of second through holes 54a-e further includes through holes (namely a third substrate through hole 54c and a fourth substrate through hole 54d) positioned along the transverse axis 58 of the frame 36. The third substrate through hole 54c is positioned proximate to a first side edge 6c of the substrate 6 and is positioned along the transverse axis 58 of the frame 36. The fourth substrate through hole 54d is positioned proximate to a second side edge 6d of the substrate 6 (the second side edge 6d being opposite to the first side edge 6c) and is positioned along the transverse axis 58 of the frame 36. The plurality of second through holes 54a-e further includes further substrate through holes 54e, which are located along and proximate to the ends 6a,b and sides 6c,d of the substrate 6a. The further substrate through holes 54e are not positioned along the axes 56, 58 of the substrate 6. The further substrate through holes 54e may be considered to be offset from the axes 56, 58.

The second through holes 54a-e pass through the substrate 6 from the upper surface 14 of the substrate 6 to a lower surface of the substrate 6 opposite to the upper surface 14. Each of the second through holes 54a-e is configured to receive a respective fastener.

In this embodiment, the second through holes 54a-e are arranged such that, when the substrate 6 is placed on the upper surface of the flange 42 (e.g. as shown in FIG. 2), each second through hole 54a-e is aligned with a respective first through hole 46 such that that a respective fastener may be placed through that aligned pair of first and second through holes 46, 54.

In this embodiment, when the substrate 6 is placed on the upper surface of the flange 42 such that each second through hole 54a-e is aligned with a respective first through hole 46, the ends and side edges 6a-d of the substrate 6 are spaced apart from the outer walls 40, thereby to allow for thermal expansion and contraction of the substrate 6.

Figure 5:
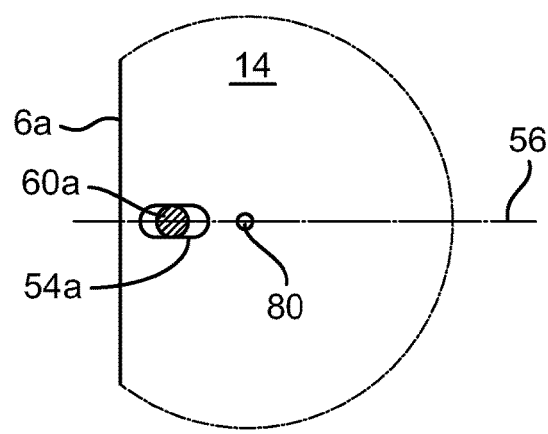
FIGS. 5 to 9 are schematic illustrations (not to scale) showing further details of the substrate proximate to respective holes through the substrate.

FIG. 5 is a schematic illustration (not to scale) showing further details of the substrate 6 proximate to the first substrate through hole 54a. FIG. 5 further illustrates the position of a first fastener 60a that is located through the first substrate through hole 54a, e.g. to couple the substrate 6 to the frame 36 as described in more detail later below with reference to FIG. 10. The position of the first fastener 60a is indicated in FIG. 5 as a hashed circle within the first substrate through hole 54a. In this embodiment, when viewed from above as in FIG. 5, the first substrate through hole 54a is elongate in a direction along the longitudinal axis 56 on which it is located. In other words, the first substrate through hole 54a may be considered to be a slot that is aligned along the longitudinal axis 56. In this embodiment, the length of the first substrate through hole 54a (i.e. the slot) along the longitudinal axis 56 is greater than a diameter of the portion of the first fastener 60a located within the first substrate through hole 54a. Also, the width of the first substrate through hole 54a (i.e. the slot) that is substantially perpendicular to the longitudinal axis 56 is substantially equal to the diameter of the portion of the first fastener 60a located within the first substrate through hole 54a.

Figure 6:
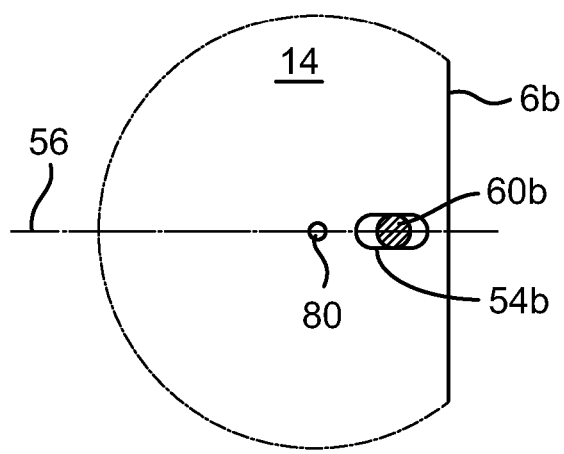

FIG. 6 is a schematic illustration (not to scale) showing further details of the substrate 6 proximate to the second substrate through hole 54b. FIG. 6 further illustrates the position of a second fastener 60b that is located through the second substrate through hole 54b, e.g. to couple the substrate 6 to the frame 36 as described in more detail later below with reference to FIG. 10. The position of the second fastener 60b is indicated in FIG. 6 as a hashed circle within the second substrate through hole 54b. In this embodiment, when viewed from above as in FIG. 6, the second substrate through hole 54b is elongate in a direction along the longitudinal axis 56 on which it is located. In other words, the second substrate through hole 54b may be considered to be a slot that is aligned along the longitudinal axis 56. In this embodiment, the length of the second substrate through hole 54b (i.e. the slot) along the longitudinal axis 56 is greater than a diameter of the portion of the second fastener 60b located within the second substrate through hole 54b. Also, the width of the second substrate through hole 54b (i.e. the slot) that is substantially perpendicular to the longitudinal axis 56 is substantially equal to the diameter of the portion of the second fastener 60b located within the second substrate through hole 54b.

Figure 7:
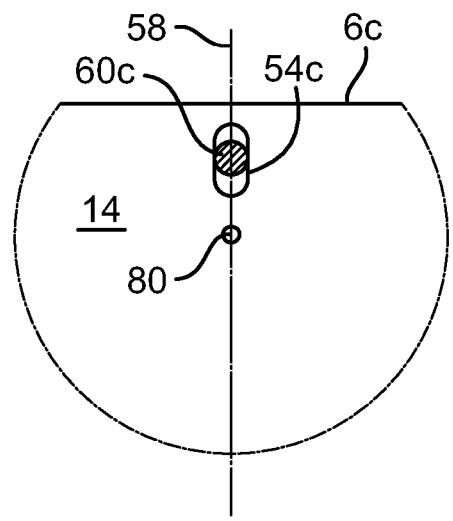

FIG. 7 is a schematic illustration (not to scale) showing further details of the substrate 6 proximate to the third substrate through hole 54c. FIG. 7 further illustrates the position of a third fastener 60c that is located through the third substrate through hole 54c, e.g. to couple the substrate 6 to the frame 36 as described in more detail later below with reference to FIG. 10. The position of the third fastener 60c is indicated in FIG. 7 as a hashed circle within the third substrate through hole 54c. In this embodiment, when viewed from above as in FIG. 7, the third substrate through hole 54c is elongate in a direction along the transverse axis 58 on which it is located. In other words, the third substrate through hole 54c may be considered to be a slot that is aligned along the transverse axis 58. In this embodiment, the length of the third substrate through hole 54c (i.e. the slot) along the transverse axis 58 is greater than a diameter of the portion of the third fastener 60c located within the third substrate through hole 54c. Also, the width of the third substrate through hole 54c (i.e. the slot) that is substantially perpendicular to the transverse axis 58 is substantially equal to the diameter of the portion of the third fastener 60c located within the third substrate through hole 54c.

Figure 8:
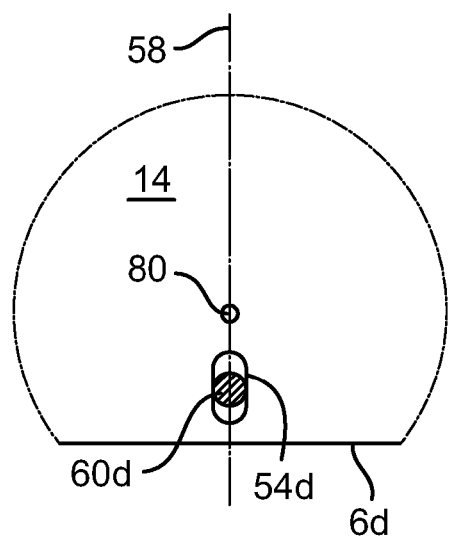

FIG. 8 is a schematic illustration (not to scale) showing further details of the substrate 6 proximate to the fourth substrate through hole 54d. FIG. 8 further illustrates the position of a fourth fastener 60d that is located through the fourth substrate through hole 54d, e.g. to couple the substrate 6 to the frame 36 as described in more detail later below with reference to FIG. 10. The position of the fourth fastener 60d is indicated in FIG. 8 as a hashed circle within the fourth substrate through hole 54d. In this embodiment, when viewed from above as in FIG. 8, the fourth substrate through hole 54d is elongate in a direction along the transverse axis 58 on which it is located. In other words, the fourth substrate through hole 54d may be considered to be a slot that is aligned along the transverse axis 58. In this embodiment, the length of the fourth substrate through hole 54d (i.e. the slot) along the transverse axis 58 is greater than a diameter of the portion of the fourth fastener 60d located within the fourth substrate through hole 54d. Also, the width of the fourth substrate through hole 54d (i.e. the slot) that is substantially perpendicular to the transverse axis 58 is substantially equal to the diameter of the portion of the fourth fastener 60d located within the fourth substrate through hole 54d.

In this embodiment, the four slots (i.e. the first, second, third, and fourth substrate through holes 54a-d) are arranged in a cruciform configuration on the substrate 6.

Figure 9:
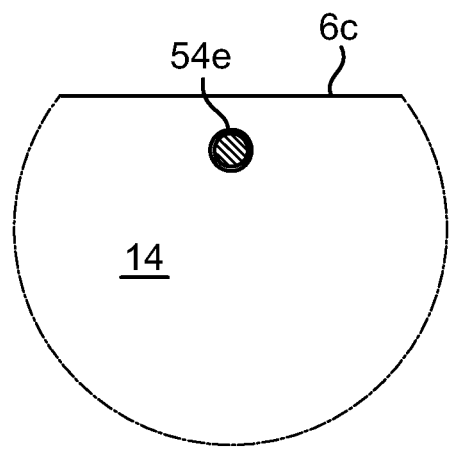

FIG. 9 is a schematic illustration (not to scale) showing further details of the substrate 6 proximate to one of the further substrate through holes 54e. the further substrate through hole 54e shown in FIG. 8 is proximate to the first side edge 6c of the substrate 6. FIG. 9 further illustrates the position of a further fastener 60e that is located through the further substrate through hole 54e, e.g. to couple the substrate 6 to the frame 36 as described in more detail later below with reference to FIG. 10. The position of the further fastener 60e is indicated in FIG. 9 as a hashed circle within the further substrate through hole 54e. In this embodiment, the diameter of the further substrate through hole 54e is greater than a diameter of the portion of the further fastener 60e located therethrough. The other further substrate through holes 54e are substantially identical to that shown in FIG. 9 and have diameters greater than those of fasteners positioned therethrough.

Figure 10:
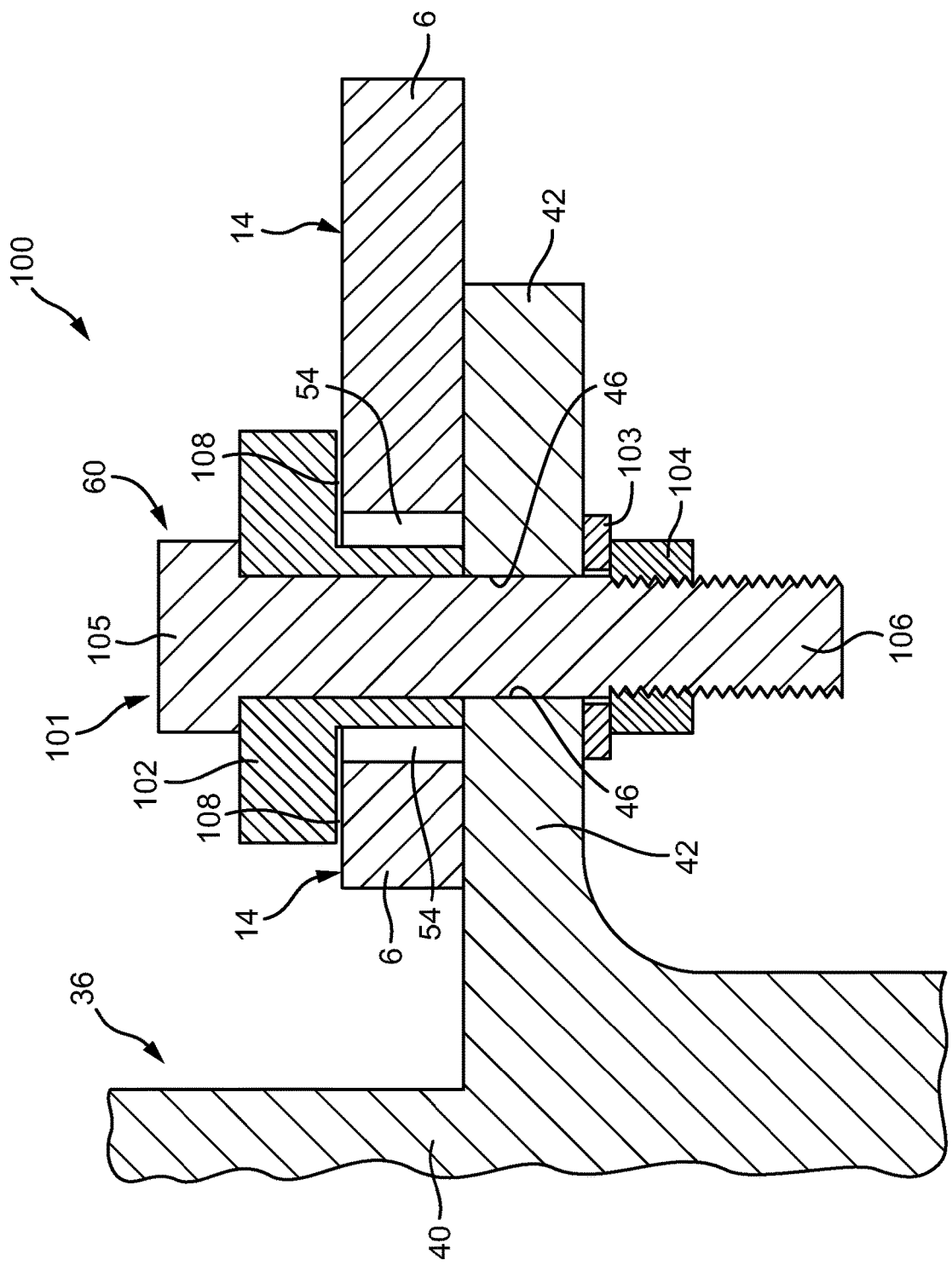
FIG. 10 is a schematic illustration (not to scale) showing a joint structure attaching together the substrate and the frame.

FIG. 10 is a schematic illustration (not to scale) showing a joint structure 100 attaching together the substrate 6 and the frame 36. In the joint structure 100, the substrate 6 is positioned on the frame 36 such that the lower surface of the substrate 6 is in contact with an upper surface of the flange 42, and such that the plurality of first through holes 46 are aligned with the plurality of second through holes 54a-e.

FIG. 10 may be a cross section through a joint structure 100 at the first substrate through hole 54a taken along the longitudinal axis 56. FIG. 10 may be a cross section through a joint structure 100 at the second substrate through hole 54b taken along the longitudinal axis 56. FIG. 10 may be a cross section through a joint structure 100 at the third substrate through hole 54c taken along the transverse axis 58. FIG. 10 may be a cross section through a joint structure 100 at the fourth substrate through hole 54d taken along the transverse axis 58. FIG. 10 may be a cross section through a joint structure 100 at a further substrate through hole 54e.

The joint structure 100 comprises a fastener 60 (e.g. a fastener 60a-e) that fastens together the substrate 6 and the frame 36. The fastener 60 is positioned through the first through hole 46 and the second through hole 54 aligned therewith.

The fastener 60 comprises a bolt 101, a capped bushing 102, a washer 103, and a nut 104.

In this embodiment, the bolt 101 comprises a bolt head 105 and an elongate shaft 106 extending from the bolt head 105. The shaft 106 extends from the bolt head 105 at the top of the joint structure 100 through, in turn, the capped bushing 102, the substrate 6 (via a second through hole 54, e.g. a substrate through hole 54a-e), the flange 42 (via a first through hole 46 aligned with the second through hole 54), the washer 103, and the nut 104. The shaft 106 comprises an external male thread. The bolt 101 may be an M12x60,0 bolt.

The capped bushing 102 comprises a sleeve positioned around the shaft 106. The capped bushing 102 comprises a flange portion extending radially outwards from the sleeve at a top end of the capped bushing 102. The top end of the capped bushing 102 is in contact with a lower surface of the bolt head 105. A bottom end of the capped bushing 102 is in contact with an upper surface of the flange 42. A lower surface of the flange portion of the capped bushing 102 opposes, i.e. faces, the upper surface 14 of the substrate 6. The lower surface of the flange portion of the capped bushing 102 is spaced apart from the upper surface 14 of the substrate 6 by a separation distance 108. In other words, there exists a gap between the lower surface of the flange portion of the capped bushing 102 and the upper surface 14 of the substrate 6. Preferably, the first distance 108 is less than or equal to 0.5 mm. More preferably, the first distance 108 is less than or equal to 0.4 mm. More preferably, the separation distance 108 is less than or equal to 0.3 mm. More preferably, the first distance 108 is less than or equal to 0.2 mm. The sleeve of the capped bushing 102 is located within the second through hole 54.

The washer 103 is positioned around the shaft 106. An upper surface of the washer 103 is in contact with a lower surface of the flange 42. A lower surface of the washer 103 is in contact with an upper surface of the nut 104. In other words, the washer 103 is sandwiched between the flange 42 and the nut 104.

The nut 104 comprises an internally threaded hole through which the shaft 106 is positioned. The nut 104 is threadedly engaged with the shaft 106 at the bottom end of the bolt 101. The nut 104 may be an M12 nut.

In this embodiment, the bolt 101 and the nut 104 provide a clamping force to clamp the capped bushing 102, the flange 42, and the washer 103, therebetween. Preferably this clamping force is less than or equal to 100 Nm. More preferably this clamping force is less than or equal to 90 Nm. More preferably this clamping force is less than or equal to 80 Nm. More preferably this clamping force is less than or equal to 70 Nm. More preferably this clamping force is less than or equal to 60 Nm.

In this embodiment, as illustrated in FIG. 10, the internal side walls of the second through hole 54 are spaced apart from the external side walls of the sleeve of the capped bushing 102 in at least one dimension. This advantageously tends to allow for movement (e.g. thermal expansion or contraction) of the substrate 6 relative to the frame 36 and fasteners 60 within the plane of the substrate 6. This movement of the substrate 6 that is within the plane of the substrate 6, or "in-plane" movement, may be defined as movement (e.g. thermal expansion or contraction) in a plane defined by the longitudinal and transverse axes 56, 58, for example along directions substantially parallel to the longitudinal and transverse axes 56, 58. This movement may comprise the substrate 6 thermally expanding from or contracting towards its centre 70, the centre 70 being the intersection the longitudinal and transverse axes 56, 58, as shown in FIG. 4.

In accordance with FIGS. 5 and 6 and the description thereof, the lengths of the first and second substrate through holes 54a-b are greater than the external diameters of the sleeves of the capped bushings 102 located within those holes 54a-b, while the widths of the first and second substrate through holes 54a-b are substantially equal to the external diameters of the sleeves of the capped bushings 102 located within those holes 54a-b. This tends to allow the substrate 6 to, during the AM process, thermally expand outwards from (or contract inwards to) its centre 70 in a directions along the longitudinal axis 56 while tending to prevent or oppose movement in the transverse direction of at least part of the substrate located along the longitudinal axis 56.

Also, in accordance with FIGS. 7 and 8 and the description thereof, the lengths of the third and fourth substrate through holes 54c-d are greater than the external diameters of the sleeves of the capped bushings 102 located within those holes 54c-d, while the widths of the third and fourth substrate through holes 54c-d are substantially equal to the external diameters of the sleeves of the capped bushings 102 located within those holes 54c-d. This tends to allow the substrate 6 to, during the AM process, thermally expand outwards from (or contract inwards to) its centre 70 in a directions along the transverse axis 58 while tending to prevent or oppose movement in the longitudinal direction of at least part of the substrate located along the transverse axis 58.

Also, in accordance with FIG. 9 and the description thereof, the diameters of the further substrate through holes 54e are greater than the external diameters of the sleeves of the capped bushings 102 located within those holes 54e. This tends to allow the substrate 6 to, during the AM process, thermally expand outwards from (or contract inwards to) its centre 70 within the plane of the substrate 6.

Thus, controlled thermal expansion and contraction of the substrate 6 during the AM process is permitted. The above described retention of the substrate 6 by the frame 36 tends to provide that the substrate 6 expands from and contracts to its centre 70. This tends to minimise any expansion or distortion movements to at most half of the effective width of the substrate 6. Advantageously the above described fixture system not only manages thermal expansion but also manages the shrinkage induced by stresses imparted by the AM process. The fixture system described herein is particularly advantageous for high temperature AM processes, for example metallic AM processes.

Furthermore, the fasteners 60 tend to prevent or oppose significant "out-of-plane" distortion and buckling movements of the substrate 6 during the AM process. "Out-of-plane" movement may be defined as movement (e.g. thermal expansion or contraction) in directions that are perpendicular to the plane defined by the longitudinal and transverse axes 56, 58. Advantageously, the fasteners 60 tend to translate potential out-of-plane movement of the substrate 6 into controlled in-plane movement. The out-of-plane movement of the substrate tends to be limited to the separation distances 108.

The above described fixture system and method of retaining the substrate tend to provide for minimal geometrical distortion of the component substrate during the deposition phase of the large, metallic, AM build processes.

The above described fixture system tends to allow for two-dimensional thermal expansion and contraction of the restrained substrate, while exerting restraint in the third direction.

The above described system and method tend to provide for improved build quality and reliability in large scale AM deposition processes. For example, using the above described fixture system, improved structural components, such as airframe components, may be produced.

The above described system and methods tend to reduce or minimise the transfer of process generated build stresses and therefore reduce substrate distortion and the potential for buckling. The above described fixture tends to restrain the substrate as near to the desired flat condition as possible, thus facilitating efficient deposition and subsequent machining on both sides of the substrate.

The substrate comprises oversize and offset through holes around the periphery of the substrate, which in use align with corresponding holes in the fixture frame. The above described bolts, bushes, washers and dry lubrication components and these oversized holes tend to prevent the substrate from deforming away from the fixture frame landing, while at the same time allowing relatively unrestrained in-plane movement.

Conventional fixture systems may attempt to keep the substrate flat by clamping it to the fixture or frame and then relying on the strength of the fixture. The above described system and method tends to avoid the use of such clamps. Also, reliance on the strength of the fixture tends to be reduced. Furthermore, on large plate substrate AM builds, this conventional clamping process tends to increase the potential for substrate distortion as the plates tend to be prone to buckling. Once established, this type of distortion tends to be very difficult to reverse or correct and the deposition process is also made much more difficult to control. The above described system and method tends to mitigate this.

Advantageously, the above described fixture may be adapted to hold different size substrates, for example smaller substrates for use as trial elements. To accommodate smaller substrates, an additional beam may be attached to the frame transversely between the two opposing side beams. This, in effect, splits the frame into two subframes, each of which may be used to retain a respective smaller substrate. The additional beam may be coupled to the frame using the first through holes and fasteners positioned there through. The additional beam may comprise a plurality of through holes for receiving a fastener for use in retaining a smaller substrate.

Holes and slots in the substrate interfacing with holes provided in the fixture supports tend to allow for a considerable amount of flexibility within the constraints of the frame, thus tending to enable various lengths of substrate to be loaded with minimal fixture adaption.

In the above embodiments, the substrate may be fabricated in any appropriate way. For example, a digital model (e.g. a computer-aided design model) of the substrate, including hole pattern, may be used manufacture the substrate.

In the above embodiments, the substrate is cuboid in shape. However, in other embodiments, the substrate is a different appropriate shape, such as cylindrical. Thus, the upper surface of the substrate upon which the article is may be a different shape other than rectangular, e.g. circular.

In the above embodiments, the frame is a rectangular frame. However, in other embodiments, the frame has a different appropriate shape, for example the frame may be circular.

In the above embodiments, the frame comprises a plurality elongate steel beams that are attached together. However, in other embodiments, the frame has a different construction. For example, the frame may comprise an integral single piece of material. Also, in some embodiments, the frame comprises one or more different materials instead of or in addition to steel.

In the above embodiments, the substrate is attached to the frame by a plurality of fasteners. In particular, twenty-four fasteners are used. However, in other embodiments, a different number of fasteners are used. Thus, the frame and the substrate may include a different number of through holes. At least four fasteners are used, arranged in a cruciform configuration along two perpendicular axes.

In some embodiments, instead of or in addition to one or more of the further substrate through holes, one or more clamps (e.g. one or more over thickness sized rail clamps) could also be used to retain the substrate yet still allow in-plane movement of the substrate. However, fasteners tend to be preferable to clamps, since they tend to lighter and more easily replaceable.

In some embodiments, in addition to the second through holes for receiving the fasteners, the substrate comprises additional features that define a datum using which the AM process may be performed. The datum features tend to facilitate precision datum location for the AM deposition process and subsequent machining operations on either side of the substrate plate. Such datum features may include additional holes through at least part of the substrate, e.g. datum holes as indicated in FIGS. 5 to 8 by the reference numerals 80. Preferably, the datum holes are through holes passing through the substrate from the upper surface to the lower surface. Preferably, there are at least three separate datum features, e.g. at least three datum holes, that define the datum. Preferably, the datum holes are located along the longitudinal and/or transverse axes. For example, a first datum hole may be located along the longitudinal axis proximate to the first end of the substrate, a second datum hole may be located along the transverse axis proximate to the first side edge of the substrate, and a third datum hole may be located either along the longitudinal axis proximate to the second end of the substrate or along the transverse axis proximate to the second side edge of the substrate. Advantageously, the above described slots and datum holes in the substrate tend to allow for the process datum to be maintained throughout the whole of the deposition phase and any subsequent machining phases regardless of any localised movement or distortion of the substrate that may occur. Precise datum control tends to be important to the turnover aspect of this type of AM deposition and in situ machining.

In the above embodiments, the first substrate through hole 54a and second substrate through hole 54b are positioned proximate to their respective ends 6a and 6b, the third substrate through hole 54c and fourth substrate through hole 54d are positioned proximate to their respective sides 6c and 6d of the substrate 6 and the further substrate through holes 54e are located proximate to the ends 6a,b and sides 6c,d of the substrate 6. In an alternative embodiment, one or more of the substrate through holes 54a-e (for example, all of 54 a-e or alternatively all of 54a-d), are extended to their respective edge or side such that they are open ended to their respective side or end of the substrate 6. This allows for larger amounts of shrinkage of substrate 6 (when compared to closed holes positioned proximate to the edges/sides) and prevents any restriction of the shrinkage and thus reduces or prevents resulting damage to the frame 36, substrate 6 and/or finished article 4. In this alternative "open hole" embodiment, the lengths of the first, second, third and fourth substrate through holes 54a-d and the diameters of the further substrate through holes 54e remain greater than the external diameters of the sleeves of the capped bushings 102 located within those holes 54a-e (as discussed with respect to FIGS. 5 to 9).

Advantageously the fixture system described herein controls and minimises the movement of the build item/article "in plane" and maintains a "nominal datum" during the thermal expansion and stress imparted distortion.

The invention claimed is:
1. A system comprising:
a substrate;
a fixture comprising an outer wall and a flange extending inwardly and perpendicularly from the outer wall, the fixture being configured to receive the substrate; and
four fasteners;
wherein the substrate has a first axis and a second axis, the second axis being perpendicular to the first axis,
wherein the substrate comprises a build surface configured to have formed thereon an article by an additive manufacturing process,
wherein the build surface is substantially parallel to a plane defined by the first and second axes,
wherein the substrate comprises a first slot, a second slot, a third slot, and a fourth slot, wherein each slot has a respective length and width, the width of a slot being perpendicular to the length of that slot, the width of a slot being less than the length of that slot, wherein each slot is a slot through the substrate from the build surface to a surface of the substrate opposite to the build surface, wherein the length of the first slot is aligned along the first axis, wherein the length of the second slot is aligned along the first axis, wherein the first and second slots are positioned at or proximate to opposite edges of the build surface to each other, wherein the length of the third slot is aligned along the second axis, wherein the length of the fourth slot is aligned along the second axis, wherein the third and fourth slots are positioned at or proximate to opposite edges of the build surface to each other, wherein for each slot, the length of that slot is greater than a diameter of a portion of the fastener that is positioned through that slot when the substrate is attached to the fixture, wherein the fixture is configured to receive the substrate by positioning the substrate against the flange, wherein the flange further comprises a plurality of through holes arranged such that, when the fixture receives the substrate by positioning the substrate against the flange, each of the through holes of the flange is aligned with a respective slot, and wherein the fasteners are configured such that, when the substrate is received by the fixture, the substrate can be attached to the fixture by locating each fastener through a respective slot and into a through hole of the flange aligned therewith.

2. The system of claim 1, wherein, for each slot, the width of that slot is substantially equal to the diameter of the portion of the fastener that is positioned through that slot when the substrate is attached to the fixture.

3. The system of claim 1, wherein the substrate further comprises one or more through holes located at or proximate to an edge of the build surface, wherein the one or more through holes are through the substrate from the build surface to the surface of the substrate opposite to the build surface, wherein the one or more through holes are spaced apart from the first and second axes, wherein the system further comprises one or more further fasteners, and wherein each of the one or more further fasteners is configured for, when the substrate is received by the fixture, attaching the substrate to the fixture by locating that further fastener through a respective through hole of the substrate.

4. The system of claim 3, wherein, for each through hole of the substrate, the diameter of that through hole is substantially equal to the diameter of the portion of the further fastener that is positioned through that through hole when the substrate is attached to the fixture.

5. The system of claim 1, wherein the substrate further comprises a plurality of datum holes, wherein each datum hole is a hole through the substrate from the build surface to the surface of the substrate opposite to the build surface, and wherein each datum hole is located along one of the axes.

6. The system of claim 5, wherein each datum hole is located proximate to a respective slot.

7. The system of claim 1, wherein, when the fixture receives the substrate by positioning the substrate against the flange, the substrate is spaced apart from the outer wall.

8. The system of claim 1, wherein, for each through hole of the flange, the diameter of that through hole is substantially equal to the diameter of the portion of the fastener that is positioned through that through hole when the substrate is attached to the fixture.

9. The system of claim 1, wherein each fastener further comprises:
a bolt comprising a bolt head and a threaded shaft extending from the bolt head;
a bushing comprising a sleeve for positioning around the shaft and a bushing flange extending radially outwards from the sleeve; and
a nut for threadedly engaging with the shaft.

10. The system of claim 9, wherein the substrate is attached to the fixture by the fasteners, wherein, for each fastener, the shaft is positioned through a slot of the substrate, the sleeve of the bushing, the fixture, and the nut such that the substrate, the bushing, and the fixture are clamped between the bolt head and the nut, wherein the bushing is located through the slot of the substrate such that the sleeve of the bushing is located within the slot and the bushing flange faces the build surface of the substrate, and wherein the bushing is configured such that the bushing flange and the build surface are spaced apart.

11. The system of claim 1, wherein the substrate is attached to the fixture by the fasteners, and wherein the fasteners are configured to apply a force of less than or equal to 60 Nm to the substrate.

12. The system of claim 1, wherein the substrate is a metal substrate.

13. The system of claim 1, wherein a size of the substrate along at least one of the axes is at least 5 m.

* * * * *